(12) United States Patent
Grady

(10) Patent No.: US 12,075,731 B2
(45) Date of Patent: Sep. 3, 2024

(54) BALING APPARATUS

(71) Applicant: Michael Jason Grady, Floravista, NM (US)

(72) Inventor: Michael Jason Grady, Floravista, NM (US)

( * ) Notice: Subject to any disclaimer, the term of this patent is extended or adjusted under 35 U.S.C. 154(b) by 674 days.

(21) Appl. No.: 17/174,098

(22) Filed: Feb. 11, 2021

(65) Prior Publication Data
US 2022/0248608 A1    Aug. 11, 2022

(51) Int. Cl.
| | | |
|---|---|---|
| A01F 15/04 | (2006.01) | |
| A01F 15/08 | (2006.01) | |
| A01F 15/14 | (2006.01) | |
| A01F 15/10 | (2006.01) | |

(52) U.S. Cl.
CPC ........ *A01F 15/046* (2013.01); *A01F 15/0875* (2013.01); *A01F 15/145* (2013.01); *A01F 2015/108* (2013.01)

(58) Field of Classification Search
CPC ........ A01F 15/08; A01F 15/04; A01F 15/046; A01F 15/145; A01F 15/0875; A01F 15/005; A01F 15/0825; A01F 2015/102; A01F 2015/107; A01F 2015/108; B30B 9/3003; B30B 9/3007; B30B 9/3014; B30B 11/327; A01D 80/00; A01D 78/001; A01D 85/005; A01D 2085/007; A01D 2085/008; A01D 87/122; A01D 90/02; A01D 90/08; A01D 90/10; A01D 90/105

USPC .................... 100/98 R, 179, 188 R
See application file for complete search history.

(56) References Cited

U.S. PATENT DOCUMENTS

| | | | | |
|---|---|---|---|---|
| 2,067,083 | A * | 1/1937 | Gregory | B29B 15/023 83/401 |
| 2,105,215 | A * | 1/1938 | Dinzl | B29B 15/023 144/193.1 |
| 2,706,238 | A * | 4/1955 | Blaser | H05B 3/00 219/227 |
| 3,099,203 | A * | 7/1963 | Klemm | A01F 15/08 100/98 R |
| 5,742,010 | A * | 4/1998 | Griffin | G01G 19/08 177/253 |
| 6,339,986 | B1 * | 1/2002 | Van Hierden | A01F 15/005 100/6 |
| 7,895,944 | B2 * | 3/2011 | Derstine | A01F 15/005 100/246 |
| 2020/0000041 | A1 * | 1/2020 | Grady | A01F 15/04 |

* cited by examiner

*Primary Examiner* — Jimmy T Nguyen

(57) ABSTRACT

Baling apparatus including a baling chamber having a stationary splitting knife disposed therein for dividing crop material picked up from a field to discharge divided bales simultaneously. Bale depth control allows production of bales of predetermined selected depths (or widths) by repositioning the roof of the baling chamber, using extensions to alter the crop-engaging surface of a plunger movable in the baling chamber and repositioning the splitting knife.

1 Claim, 15 Drawing Sheets

BALING APPARATUS

CROSS-REFERENCE TO RELATED PATENT APPLICATION

The present application is a continuation-in-part of pending U.S. patent application Ser. No. 17/127,112 filed Dec. 18, 2020 which is a continuation of U.S. patent application Ser. No. 16/025,751 filed Jul. 2, 2018 which issued on Dec. 22, 2020 as U.S. Pat. No. 10,869,428. The present application claims priority from the above referenced applications and the entire disclosures of the above applications are incorporated herein by reference.

BACKGROUND OF THE INVENTION

Field of the Invention

The present invention relates to baling apparatus wherein multiple square bales of crop material are formed simultaneously and delivered in a manner to facilitate collecting the bales.

Brief Discussion of the Related Art

Picking up and baling of crop material in a field is an integral aspect of farming and is an expensive and labor-intensive process. The crop material typically is forage such as, for example, hay, biomass, alfalfa, straw, coastal Bermuda, and corn stalks, and is referred to herein as crop material. Typically, crop material is picked up by machinery movable along the field and fed to a baling chamber where the crop material is compressed and tied to form bales. "Square" bales are preferred in that square shouldered bales facilitate stacking, delivery, and use; and, as used herein square bales means having square shoulders. Attempts to improve baling efficiency have included the production of very large bales which are heavy, awkward, and difficult to handle, such that truck loads and storage are not maximized. That is, current baling apparatus and methods do not move the most amount of baled material in the least amount of time. Another attempt to provide efficient baling is described in U.S. Pat. No. 3,099,203 to Klemm et al by producing bales in pairs or sections of a reduced size. The Klemm et al baling machine utilizes a stationary blade mounted in a baling chamber along with a movable second blade mounted on a plunger to be movable therewith. The stationary and movable blades have tapered cutting edges which exert a shearing action on material therebetween. The combination of stationary and movable blades has the disadvantage of requiring a complex blade arrangement in an attempt to prevent intermingling of fibers of the sections as the sections are discharged from the baling chamber.

Another disadvantage of currently available baling apparatus is that a particular baling machine is only capable of producing bales of crop materials where the bales are of a particular size. If a farmer desires bales of a different size, the farmer must purchase or rebuild a different baling apparatus at substantial cost particularly due to the welding of components of the baling chamber as well as the need for different size plungers. Freeman, a division of Allied Systems Company, provides a kit for use in changing the size of a baling chamber; however, the Freeman baling chamber kit is extremely complicated due to using the concept of repositioning the floor of a baling chamber and also requiring welding of a new top or roof for the baling chamber.

Accordingly, there is a need for baling apparatus that can be utilized to produce small square bales of differing sizes at minimal expense.

SUMMARY OF THE INVENTION

The present invention overcomes the disadvantages of prior art baling apparatus and techniques and increases the amount of crop material baled from a field in the least amount of time by utilizing crop pickup units designed for use with large square balers and dividing large square bales into smaller bales in the baling apparatus while moving in the fields.

In one aspect, the present invention involves baling apparatus where different square bale sizes can be obtained from a single frame embodiment. In this aspect, the position of the top plate or roof of the baling chamber can be vertically positioned (i.e. raised or lowered) utilizing spacing members disposed between the side walls and the baling chamber roof in cooperation with changing the size of the crop-engaging surface of the plunger and changing the position of the splitting knife which is mounted on the roof. For example only, by utilizing one or two spacing members having a thickness of one inch, the baling chamber can produce three normally desired bale sizes such as square bales having depth (or width) of 14 inches, 15 inches and 16 inches. To this end, the frame for the baling apparatus is produced using steel weldment techniques to accommodate the largest size square bale to be produced (in the above example, 16 inches). The spacing members can be utilized in combination with L-channel steel members of the frame and UHMW plastic. In this example, a spacing member incorporating a one inch UHMW shim can be used to make a 15 inch square bale and spacing members formed of two such shims (two inch spacing) can be used to make a 14 inch square bale. With no spacing members or shims the baling chamber can be used to make a 16 inch square bale. The same plunger is used for the three exemplary size bales and extensions are secured to the crop-engaging surface of the plunger, for example by bolting, to cause the crop-engaging surface of the plunger to have a height dimension substantially the same as the height in the modified baling chamber. Accordingly, cost for altering the size of the bales is substantially reduced by not requiring different plungers to produce different size bales. The splitting knife is fixed to the roof of the baling chamber at an upper portion of the splitting knife and bolted to the frame via a plurality of vertically spaced mounting holes disposed in the lower portion of the splitting knife to permit the portion of the splitting knife exposed within the baling chamber to correspond with the height of the baling chamber. Similarly, one straight-through rod holds the set height of tension rails disposed at the exit end of the baling chamber which is adjustable utilizing blocks of solid steel (one inch blocks in the example set forth above). At the rear of the tension rails a member with three vertically aligned holes is provided, for the example set forth above, to similarly provide the predetermined height set by the spacing of the roof as set forth above, for example a one inch block for producing a 15 inch square bale, a two inch block for producing a 14 inch square bale and flush mounting for producing a 16 inch square bale. From the above, it will be appreciated that the baling apparatus of the present invention has substantial advantages over prior art baling apparatuses in that the baling apparatus permits modification to control baling chamber size with a single baling apparatus while producing smaller square bales of a desired size to accommodate many handling and transportation issues to meet various requirements of the ultimate consumer and taking into account the crop material being baled.

Other aspects and advantages of the present invention will become apparent from the following description taken in conjunction with the accompanying drawings wherein like parts in each of the several figures are identified by the same reference characters.

DETAILED DESCRIPTION OF THE INVENTION

Figure 1:
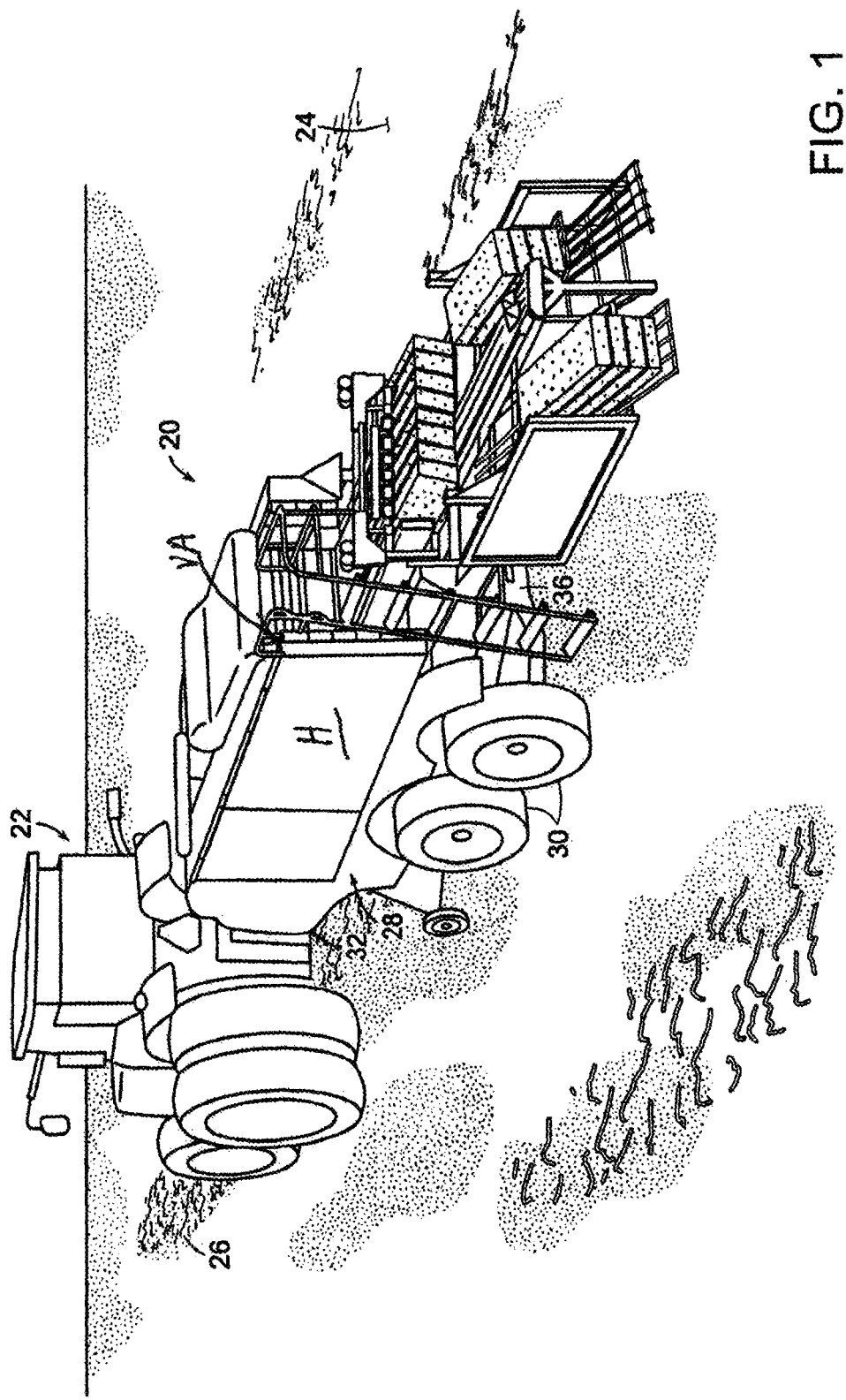
FIG. 1 is a perspective view of the baling apparatus of the present invention in use in a field.
Figure 2:
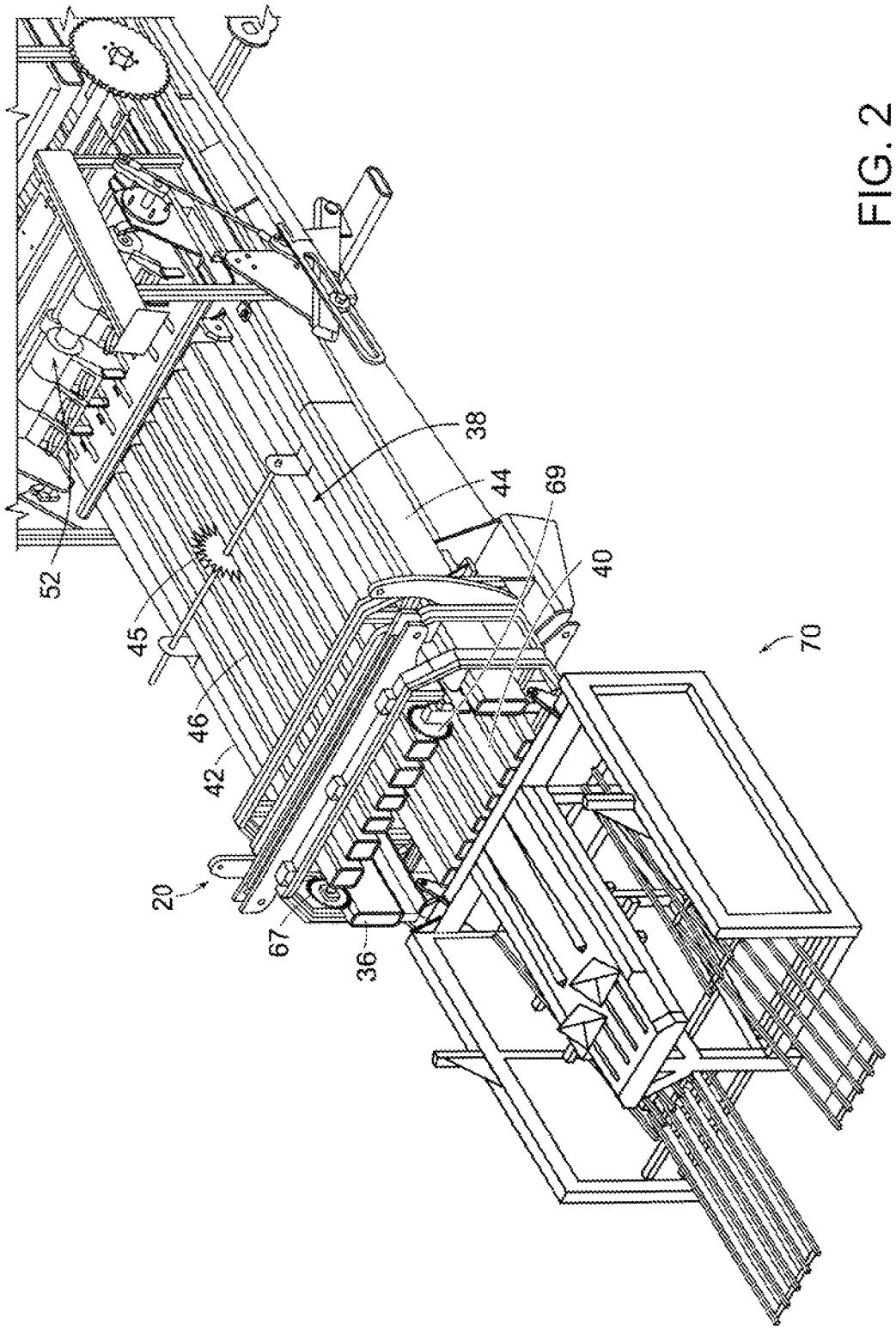
FIG. 2 is a broken perspective view of the baling apparatus.
Figure 3:
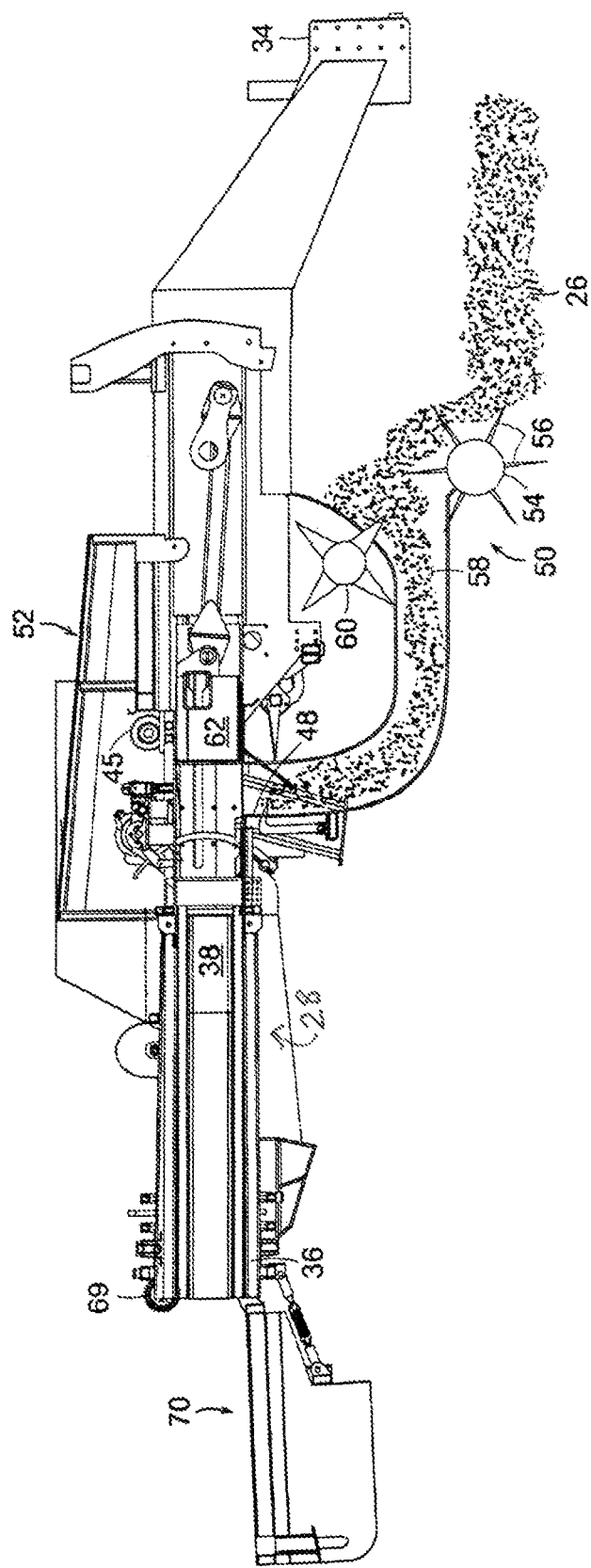
FIG. 3 is a side view of the baling apparatus in partial section with parts broken away.
Figure 4:
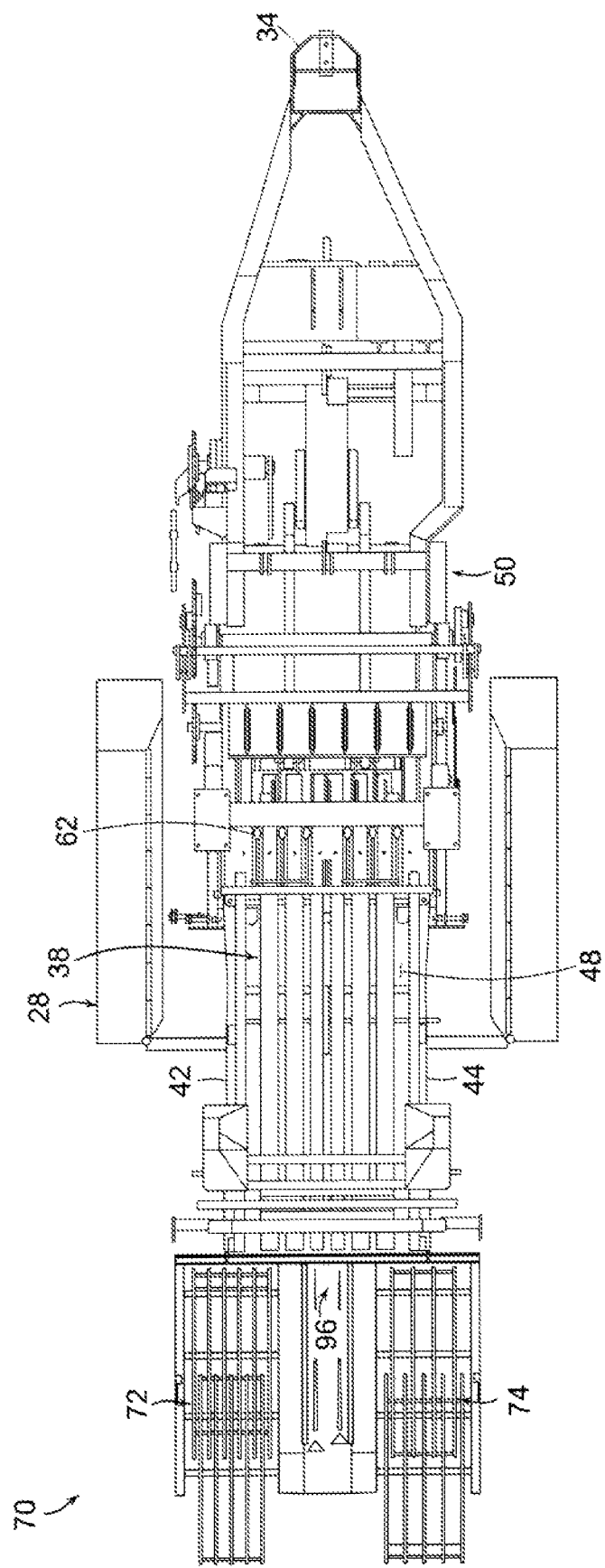
FIG. 4 is a top view of the baling apparatus.
Figure 5A:
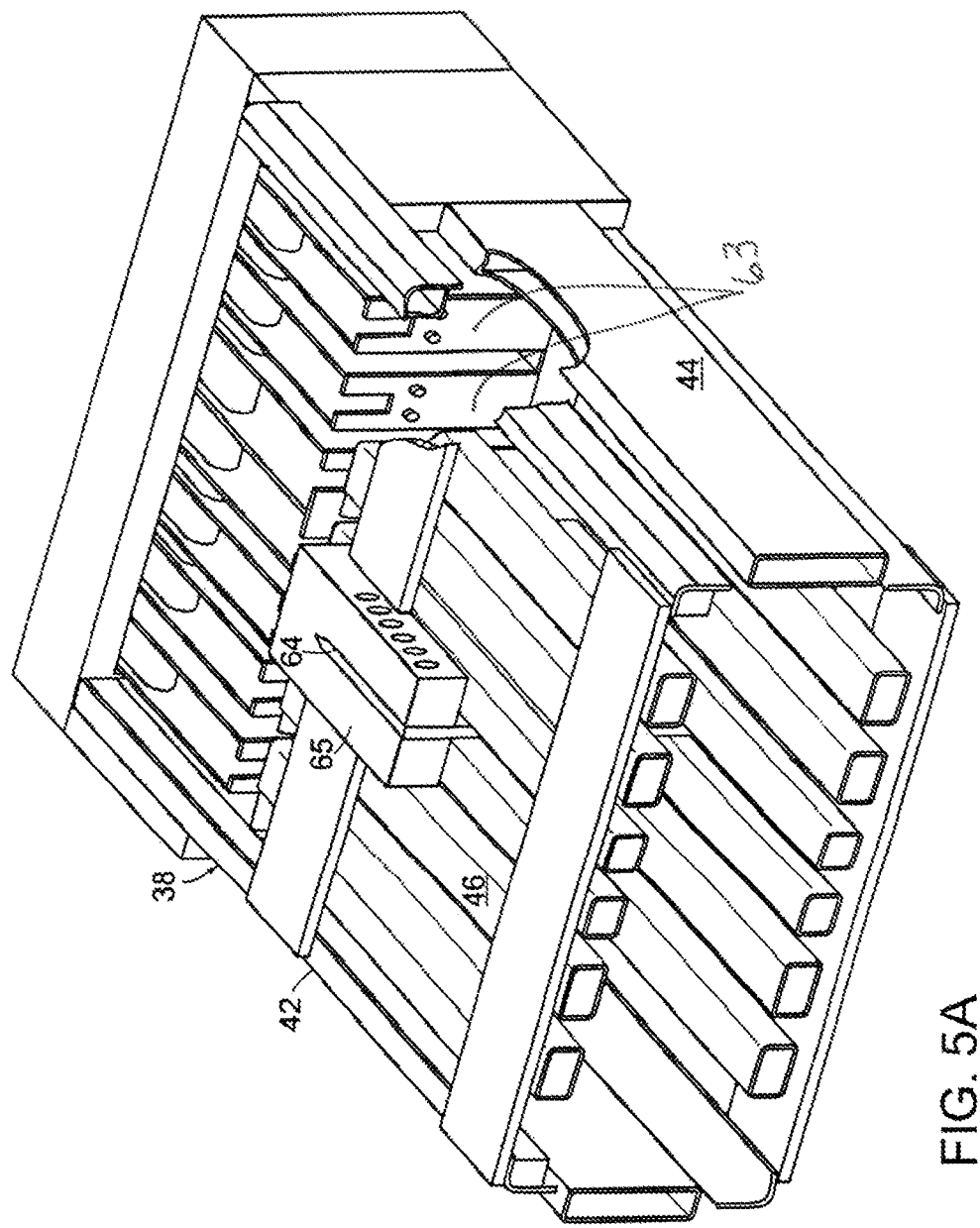
FIG. 5a is a broken perspective view of the baling chamber and the crop-engaging surface of the plunger.
Figure 5B:
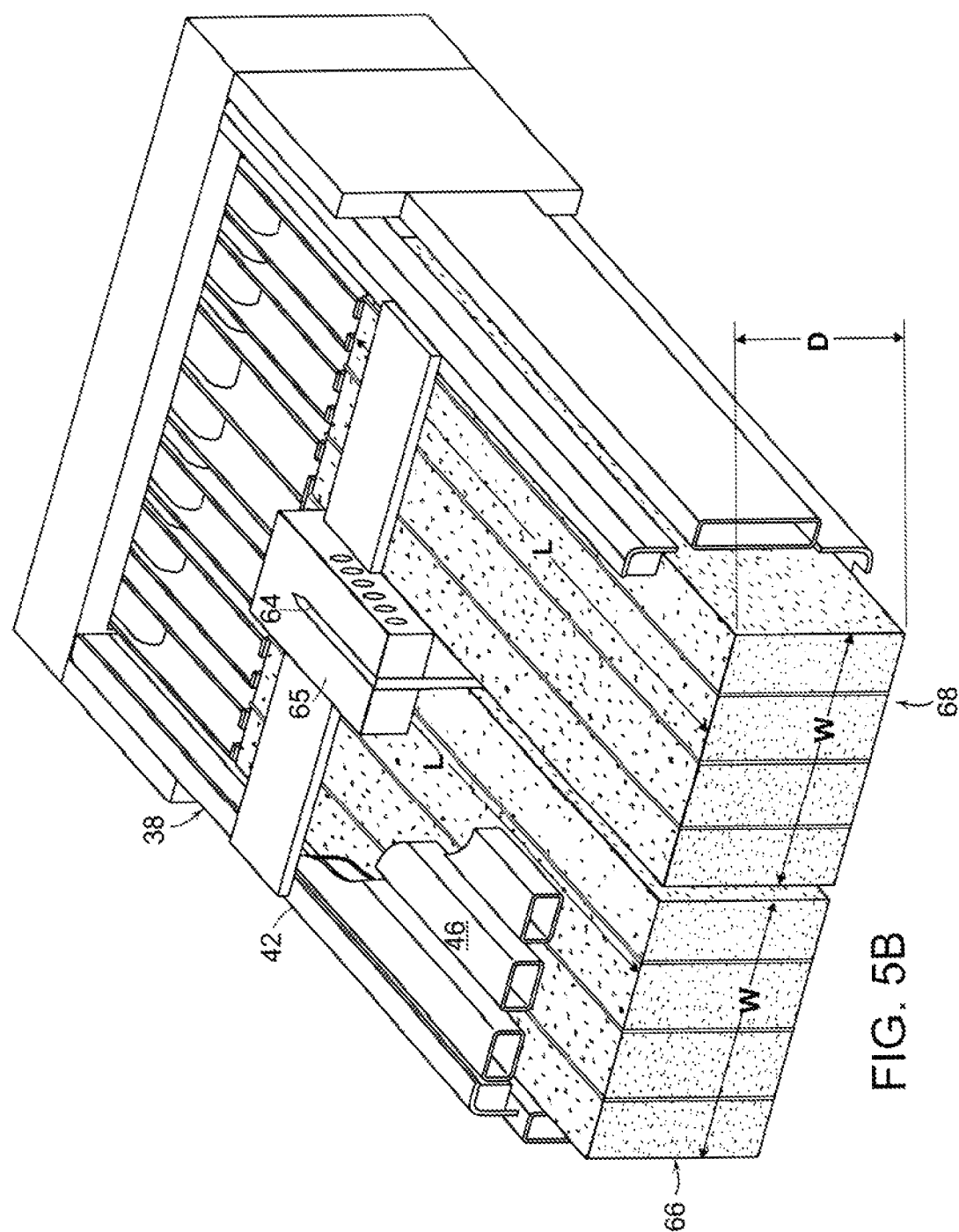
FIG. 5b is a broken perspective view of the baling chamber and plunger after initial splitting of crop material to be baled.

With reference to the drawings, baling apparatus 20 is shown in FIG. 1 for use with motive means, such as a tractor 22, for moving the baling apparatus 20 along a field 24 laden with crop material 26 to be baled. As shown in FIGS. 1-4, the baling apparatus includes a frame 28 having wheels 30 on opposite sides thereof, a front or leading end 32 coupled with the tractor via a hitch 34 and a rear or trailing end 36 for ejecting bales of the crop material. The baling apparatus 20 is shown in FIG. 1 as being pulled along the field 24 by a tractor; however, the baling apparatus 20 can be self-propelled to move in the manner exemplified by the Freeman Division of Allied Systems Company Model 380, Self-Propelled Baler. A baling chamber 38 as shown in FIGS. 5A and 5B is carried on the frame in a baling area defined between the front end and the rear end of the frame. The baling chamber has a floor or bottom 40 extending horizontally along the frame, spaced vertical side walls 42 and 44 extending vertically from the floor and a top or roof 48. An inlet 48 is located in the floor 40 above a pickup unit 50. The roof, the floor and the side walls are formed of spaced tubular members to reduce weight and the spacing between the tubular members of the roof and the floor accommodate needles and twine of knot-tying means 52 carried by the frame and also allow adjustable control of compression of bales in the baling chamber. The knot-tying means is of conventional construction such as the knotters used in the Freeman Division of Allied Systems Company Model 370 Baler.

The pickup unit 50 is coupled with frame 28 and includes a rotating pickup head 54 with tines 56 extending radially outward from the edge such that the tines rotate and pickup the crop material 26 and send it rearward to a pickup chamber 58 to create preformed flakes of the crop material. The preformed flakes are supplied to the inlet 48 of the baling chamber by force from rotating fingers 60. The pickup unit and chamber are of conventional construction, such as the pickup and packer used in the Heston/Massey Ferguson Large Square Baler Model 2170.

A plunger 62 is movably disposed in the baling chamber 38 to have a rest position as shown in FIG. 5a forward of the inlet 48. The plunger is hydraulically moved rearward to compress crop material received in the baling chamber from the pickup unit such that a crop-engaging surface arrangement 63 on the end of the plunger pushes the compressed crop material against and past a splitting knife 64 which is stationary and extends vertically from the floor 40 in a plane parallel with the vertical side walls 42 and 44. Movement of the plunger to form successive bales from successive flakes is controlled by a toothed wheel 45 disposed on the roof of the baling chamber to be rotated as crop material passes thereby and provides signals to control circuitry such as a computer. Control of the size and weight of the split bales is achieved by rotary sensors 67 and 69 which sense the parameters of each of the bales and provide an indication of any need to vary the flow of crop material to the baling chamber.

Figure 10A:
FIG. 10a is a top view of the splitting knife.
Figure 10B:
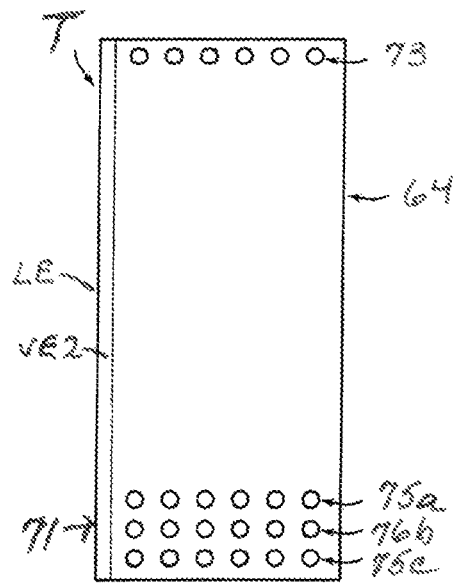
FIG. 10b is a diagrammatic side view of the splitting knife illustrating the relationship of the splitting knife and the plunger crop-engaging surface.
Figure 11:
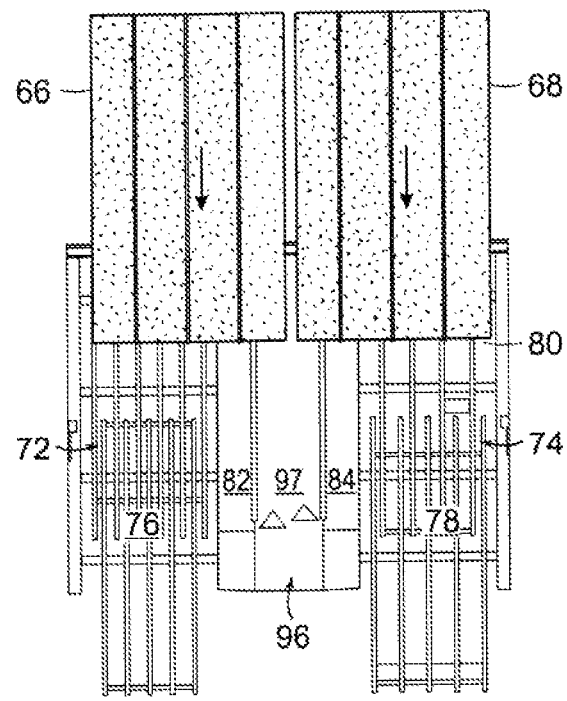
FIG. 11 is a top view of bales entering the ejection chute structure simultaneously after splitting.

The splitting knife 64 is shown in FIGS. 10a and 10b by itself and in FIGS. 5a and 5b in mounted position in the baling chamber. The upper portion or top T of the splitting knife is fixed to the roof 46 of the baling chamber as shown at 65 and the lower portion 71 of the splitting knife is adjustably mounted to the frame 28 below the floor of the baling chamber. A plurality of holes 73 in the upper portion of the splitting knife permit mounting to the roof in a stable fashion so as not to be moved by pressure from the plunger. The lower portion of the splitting knife has a plurality of vertically spaced lines of mounting holes 75a, 75b and 75c to mount the lower portion of the splitting knife to the frame; however, only one horizontal line of mounting holes is utilized dependent upon the size (depth) of the bales to be produced. As shown in FIG. 10a, the splitting knife 64 has a sharpened leading edge LE. Opposing vertical cutting edges VE1 and VE2 form an angle 77 and extend from the leading cutting edge such that the splitting knife assists center splitting of the compressed crop material. The crop material received in the baling chamber inlet is in the form of preformed flakes, and the plunger mashes the preformed flakes of crop material into the face of the splitting knife to split each flake as it enters the bale forming portion of the baling chamber. Accordingly, each flake of the crop material is formed into two bales in the baling chamber while each bale is being made. A completed bale is typically made up of 12-15 flakes and can range from 80 pounds up to 180 pounds depending on desired bale weight. The portion of the baling chamber rearward of the splitting knife forms a tension chamber controlled by hydraulic cylinders with the use of a computer to create the desired weight in each bale. The tension chamber squeezes the top, bottom and sides of the bales to achieve the desired weight and size of each bale. The bales 66 and 68 are formed by the splitting knife, which is mounted to be stationary as noted above, and are tied by the knotting means 52. The splitting knife is not required to move to create the splitting action and is prevented from movement by bolting the splitting knife thereby assuring consistent splitting and forming of the bales. As shown in FIG. 11, bales 66 and 68 are discharged simultaneously from the open end of the baling chamber with the bales positioned close to each other, that is, separated primarily only by the width of the splitting knife. In FIG. 5b, the depth D of the bales is less than the width W of the bales and the length L of the bales. The dimensions of square bales are described utilizing various language; and, accordingly, it should be appreciated that the depth D of the baling chamber and the height shown in FIG. 5b is many times referred to as the width.

Figure 6:
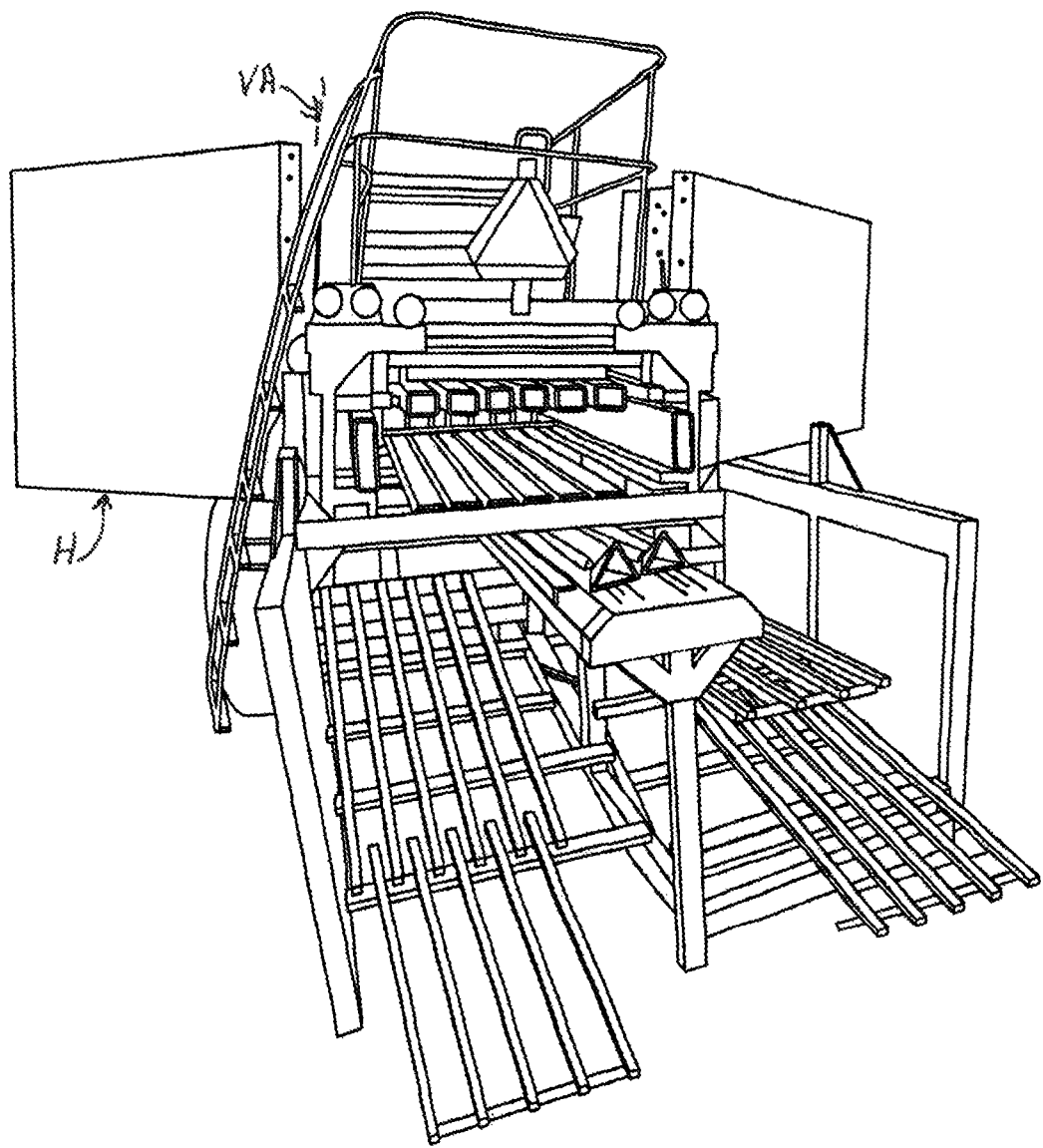
FIG. 6 is a perspective end view of the baling apparatus.
Figure 7A:
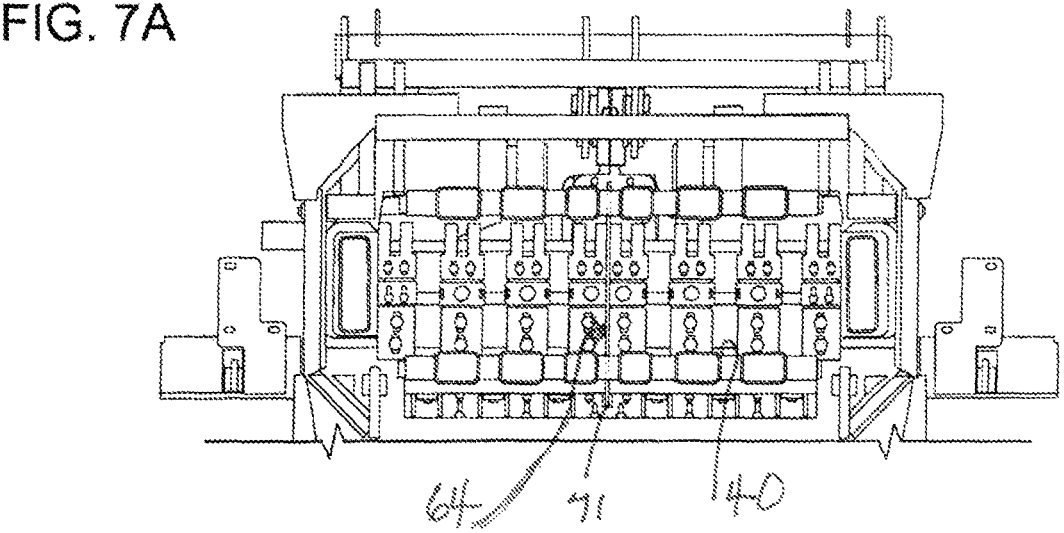
FIGS. 7a, 7b and 7c are views of the crop-engaging surface of plungers modified for use with different size baling chambers.
Figure 7B:
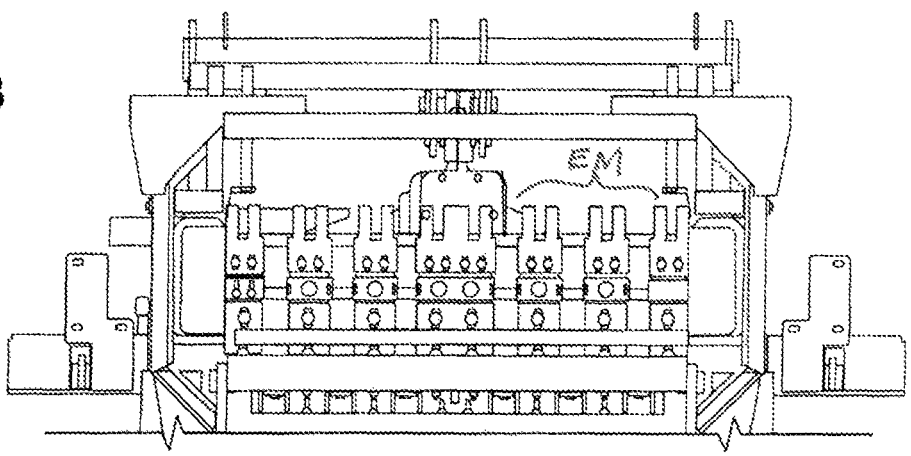
Figure 7C:
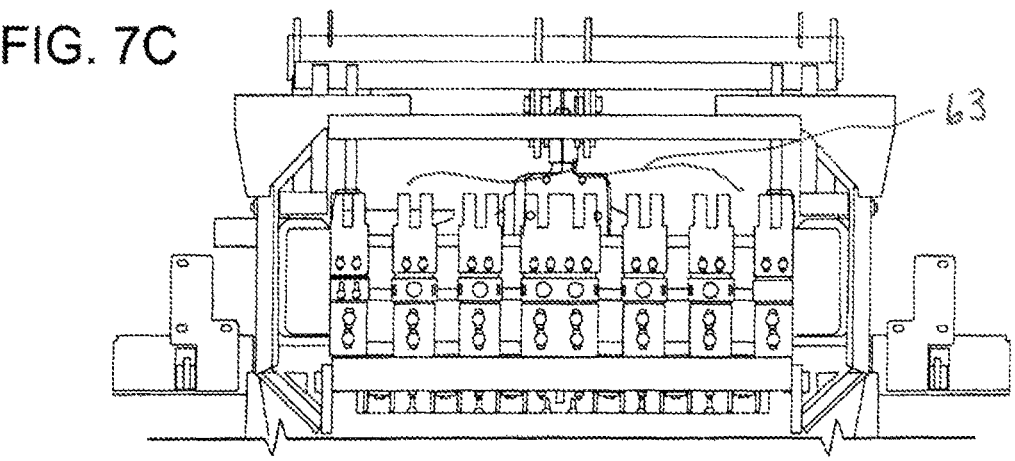
Figure 9:
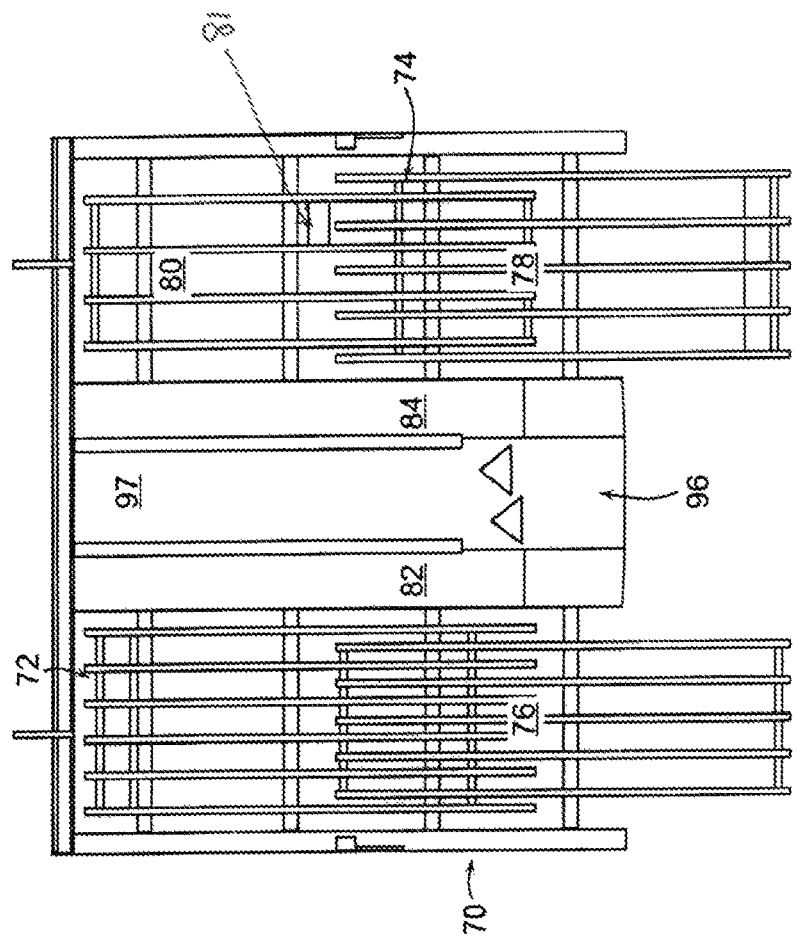
FIGS. 8 and 9 are perspective and top views, respectively of the ejection chute structure of the baling apparatus.
Figure 8:
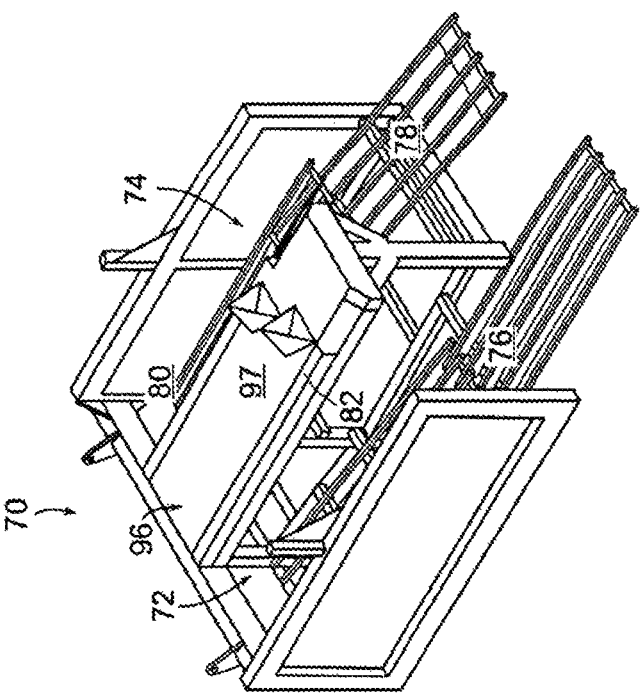
Figure 12:
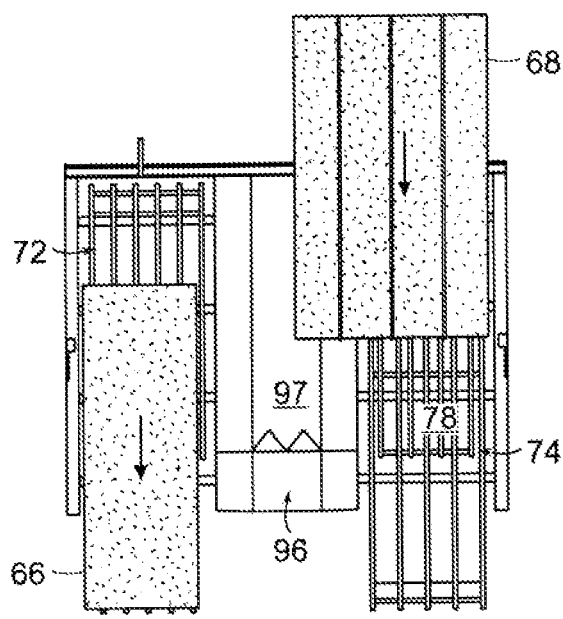
FIG. 12 is a top view illustrating delay and turning of the bales in FIG. 11.
Figure 13:
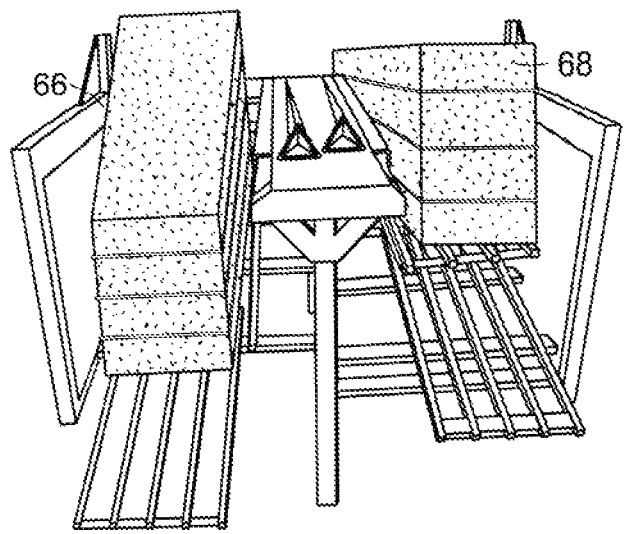
FIG. 13 is an end view of the bales in FIG. 11 where one bale is exiting the ejection chute structure and the other bale is delayed.
Figure 14:
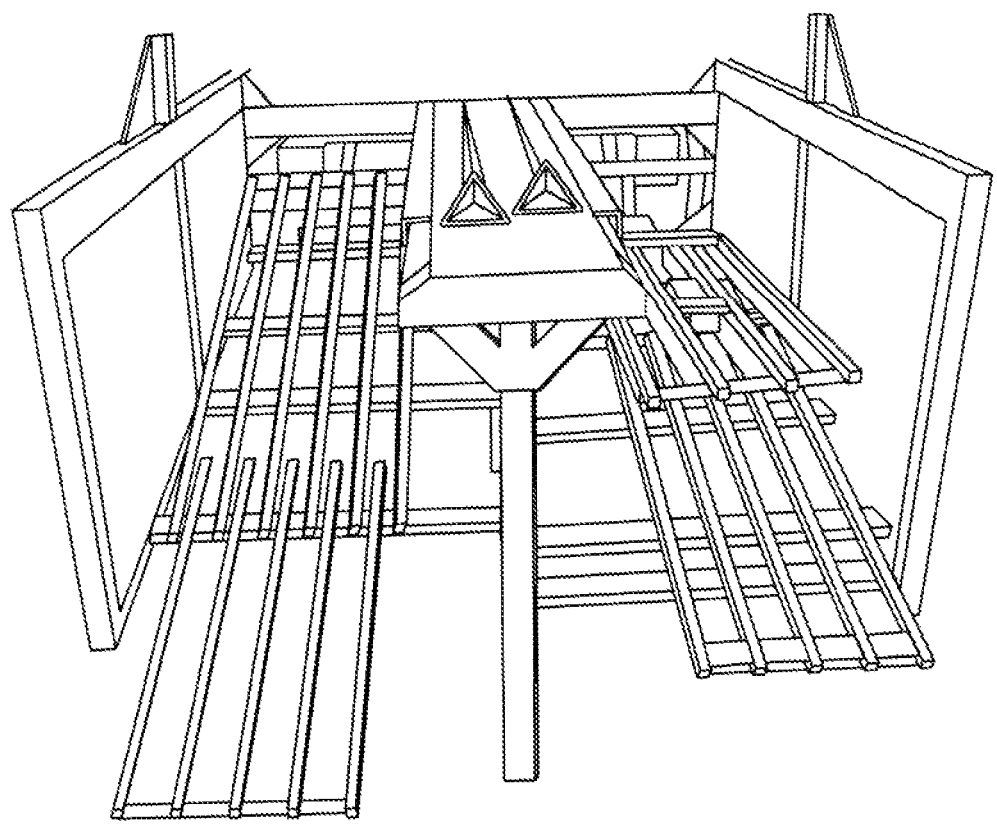
FIG. 14 is an end view in perspective of the ejection chute structure.
Figure 15:
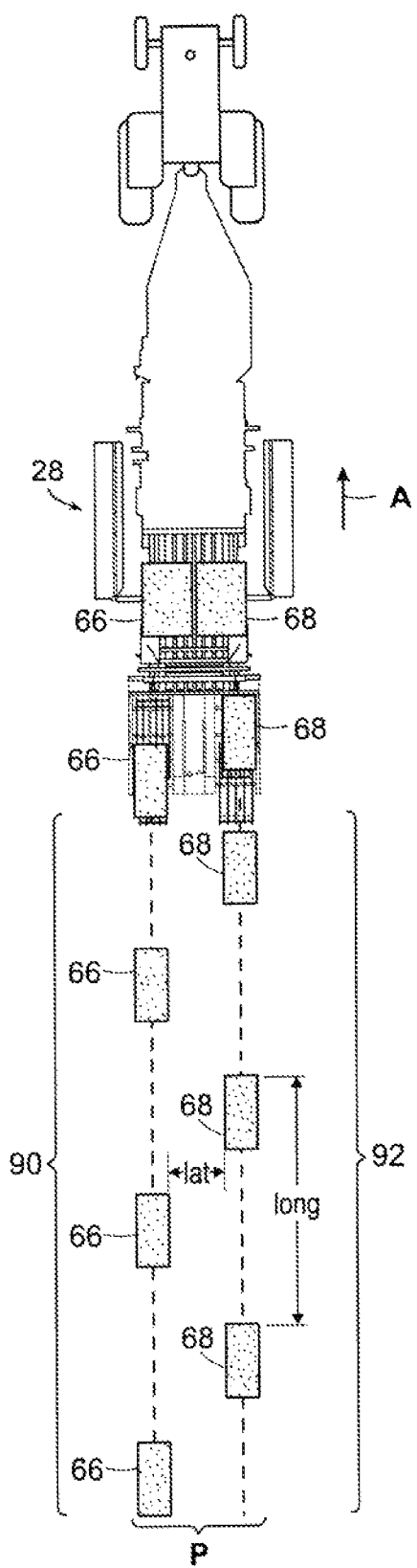
FIG. 15 is a representation of the positioning of bales after exiting the ejection chute structure.
Figure 16:
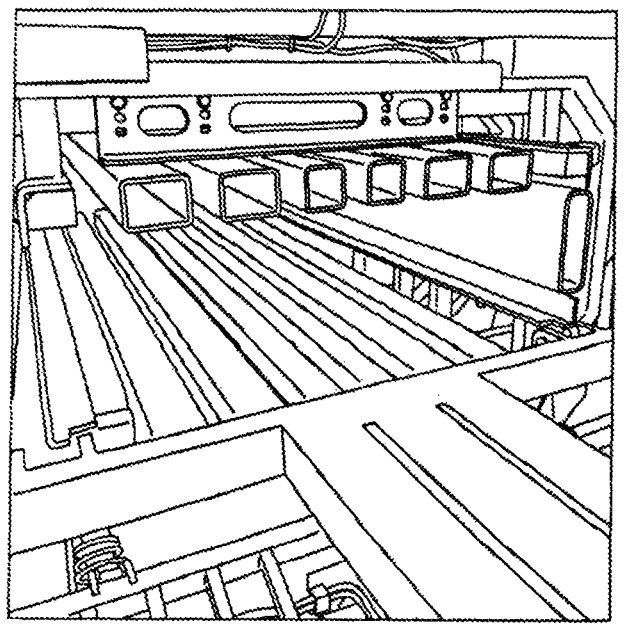
FIGS. 16 and 17 are partial views of the end of the baling chamber illustrating the use of spacing members and holding positions for the roof tension rails at the exit of the baling chamber.
Figure 17:
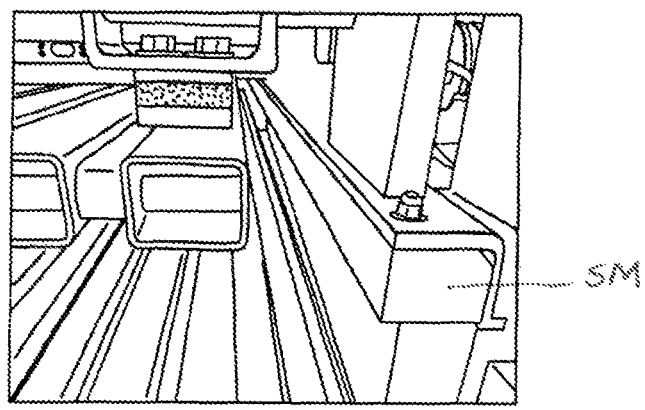

An ejection chute structure 70, as shown in FIGS. 6, 8 and 9, is disposed at the rear end 36 of frame 28 and simultaneously receives the bales 66 and 68 as the bales are discharged from the exit of the baling chamber. The ejection chute structure 70 is pivotally carried at the rear end of the frame and includes first and second slideways 72 and 74 extending from the end of the frame to deliver the bales. Both slideways are formed of spaced bars or rods. Slideway 72 is shown as being formed of two sets of spaced rods with the two sets of rods being essentially aligned. The slideway 74 is also formed of two sets of spaced bars; however, unlike slideway 72, the sets of bars of slideway 74 are not aligned. Accordingly, an upper set of spaced bars 76 is horizontally positioned such that a bale received on the slideway portion 80 will not be moved by gravity and is therefore stalled or delayed on the bars 80 which form a platform. The platform 80 also carries a scale 81 that permits a bale thereon to be weighed. Once the bale on the platform 80 is contacted by the next bale exiting the baling chamber, the stalled bale will be pushed off of the platform 80 and onto the lower portion 78 of the slideway and will be ejected from the chute structure after the bale on slideway 72 has been ejected. Slideway 72 receives the first bale 66 substantially directly from the baling chamber. The slideway 74 receives the second bale 68 from the baling chamber at the same time as bale 66 is received but is stalled or slowed due to the horizontal positioning of the first section of the slideway 74. That is, the slideway 74 is configured to stall or delay rearward movement of the second bale 68. The slideways are separated by a support surface 96, and triangular, angled surfaces are positioned on surface 97 adjacent edges 82, 84 such that the bales will be rotated 90 degrees as shown in FIG. 13. The triangular protrusions are longitudinally spaced such that the bale 66 will be turned as shown in FIG. 12 before bale 68 is turned. FIG. 13 shows both bales turned 90 degrees with bale 66 beginning to be ejected while bale 68 remains on the platform 80. With the bales "stood up" or rotated before being ejected from the end of the ejection chute structure, collection of the bales is facilitated. Accordingly, it can be seen that the bales 66 and 68 are spaced laterally by the rotation and longitudinally by the delayed or staggering ejection of bale 68 being ejected after bale 66 as shown by paths 90 and 92 forming a longitudinal path in the field 24.

Figure 18:
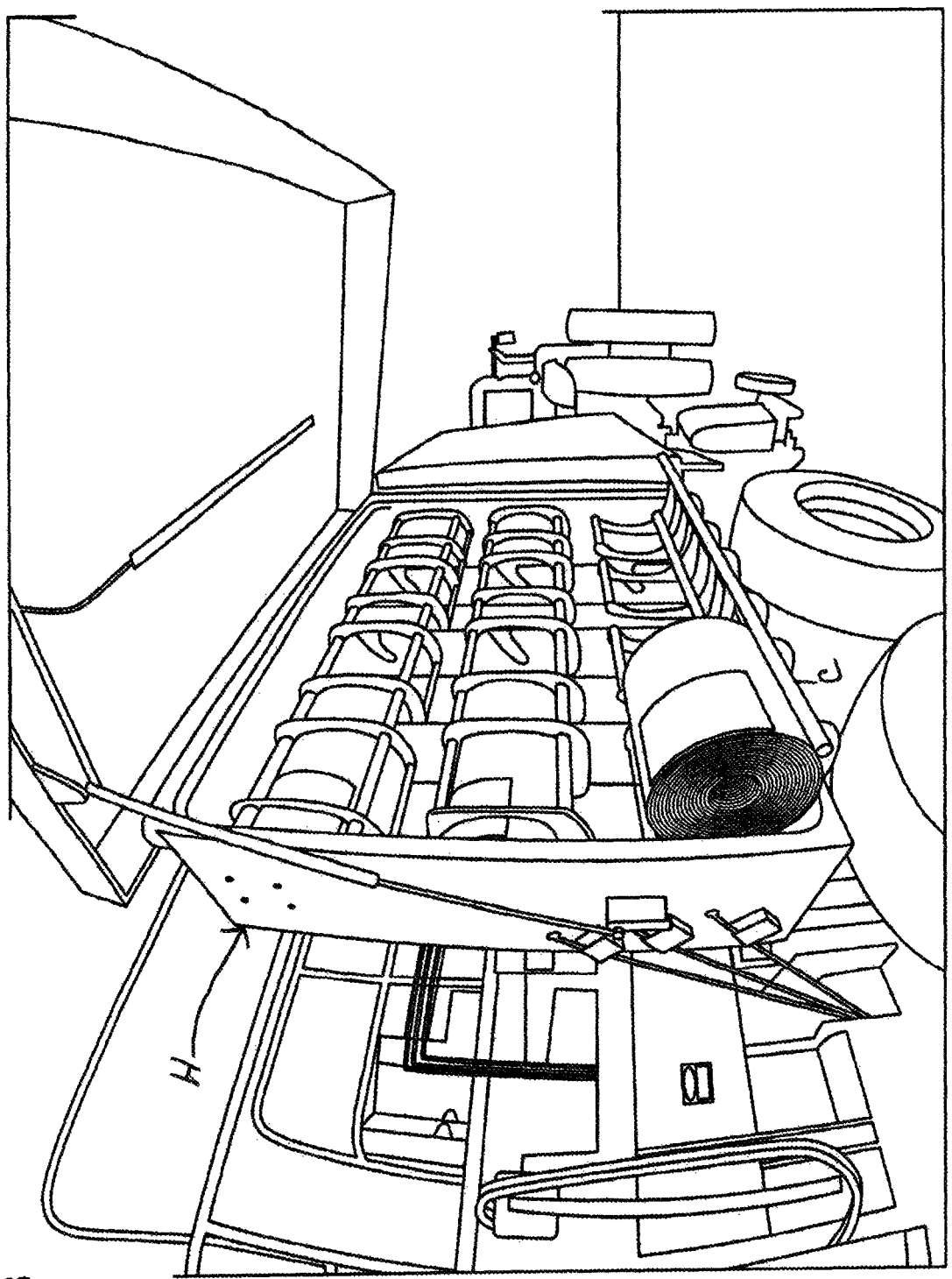
FIG. 18 is a broken perspective view illustrating the twine box for the baling apparatus.

A twine box for storing and supplying twine to the knotters is shown in FIGS. 1, 6 and 18 and is carried on the frame 28. The twine box includes a housing H mounted on a vertical axis VA along one of the sides of the frame and the twine box can be pivoted on the vertical axis to provide access to the baling chamber, the stationary splitting knife, the plunger and the knotting assembly when the housing is pivoted away from the frame. A plurality of cradles C are disposed within the housing with the cradles designed to hold a twine ball having a central axis to horizontally position the axis of the twine ball in each of the cradles. Each of the cradles is pivotal on the horizontal axis to receive the twine balls. A cover carried by the housing of the twine box on a horizontal axis permits the cover to be pivoted away from the housing to allow axis access to the twine balls.

In as much as the present invention is subject to many variations, modifications and changes in detail, it is intended that all subject matter discussed above or shown in the accompanying drawings be interpreted as illustrative only and not be taken in a limiting sense.

What is claimed is:

1. Apparatus for baling crop material in a field comprising:
   a frame having a front end and a rear end spaced from said front end to define a baling area disposed between said front end and said rear end;
   a baling chamber supported by said frame in said baling area, said baling chamber having an inlet section for receiving crop material to be baled, an outlet section for discharging bales of said crop material, a floor extending horizontally along said baling area of said frame, first and second side walls extending vertically from opposing sides of said floor, respectively, and a roof disposed above said floor and said first and second side walls;
   a stationary splitting knife disposed in said baling chamber to extend vertically from said floor in a plane parallel with said vertical side walls, and having a lower portion adjustably fixed to said frame below said floor and an upper portion fixed to said roof, said splitting knife having a leading cutting edge and angled cutting edges tapering to said leading cutting edge;
   a plunger movable within said baling chamber and having a crop-engaging surface arrangement for contacting the crop material to be baled and to compress the crop material to be baled as said plunger is moved, said plunger moving the compressed crop material toward said splitting knife and pushing the compressed crop material against and past said splitting knife to be center split and form first and second square bales of the crop material;
   an ejection chute structure disposed at said rear end of said frame at a position to receive said first and second bales from said baling chamber; and
   bale depth control means for producing bales of a predetermined selected depth where the depth is defined as a predetermined distance between said baling chamber floor and said baling chamber roof, said control means including spacing members disposed between said side walls and said baling chamber roof to position said baling chamber roof at said predetermined distance from said baling chamber floor, extensions carried by said crop-engaging surface of said plunger to cause said crop-engaging surface of said plunger to have a height substantially the same as said predetermined distance from said baling chamber floor and said baling chamber roof, and a plurality of vertically spaced mounting holes disposed in said lower portion of said splitting knife to allow said splitting knife to be positioned such that said upper portion of said splitting knife is spaced above said floor of said baling chamber by a distance substantially the same as said predetermined distance between said baling chamber floor and said baling chamber roof.

* * * * *